UNITED STATES PATENT OFFICE.

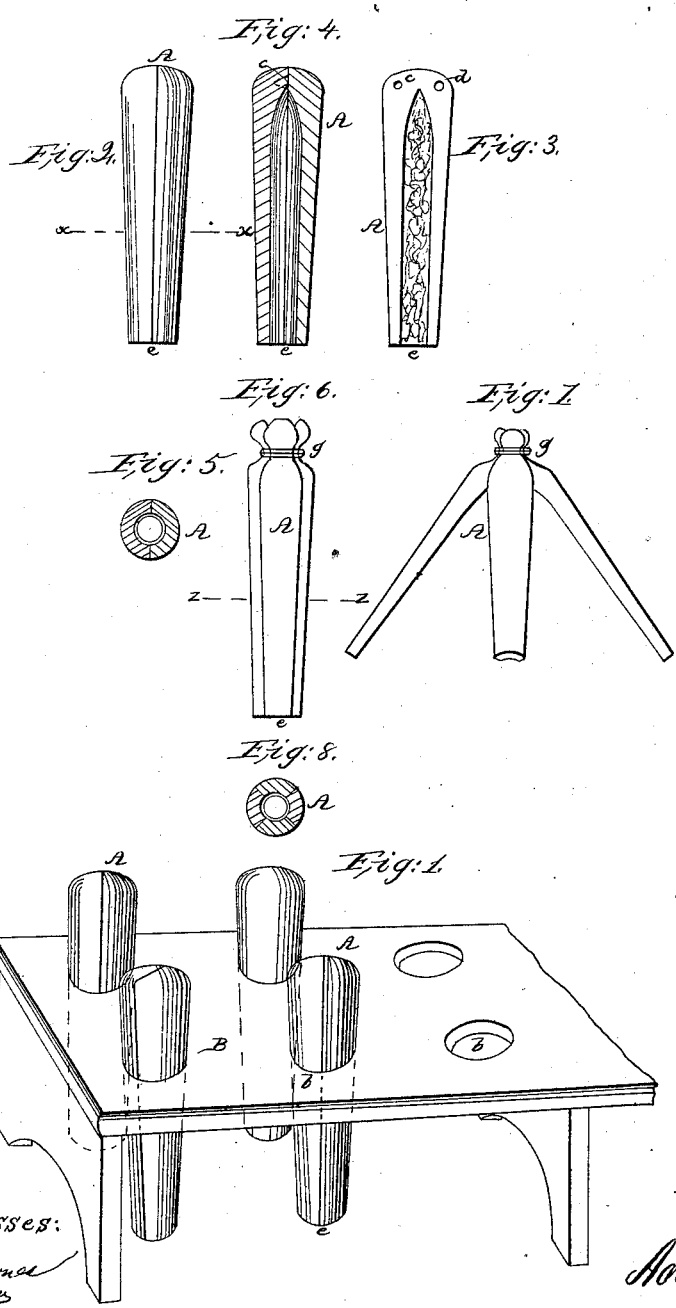

ADOLPH PEARL, OF NEW YORK, N. Y.

IMPROVEMENT IN MOLDS FOR SHAPING AND DRYING CIGAR-BUNCHES.

Specification forming part of Letters Patent No. 108,290, dated October 11, 1870.

*To all whom it may concern:*

Be it known that I, ADOLPH PEARL, of the city, county, and State of New York, have invented a new and useful Improvement in Apparatus for Pressing, Shaping, and Drying Cigar-Bunches; and I do hereby declare that the following is a full, clear, and exact description of the same, reference being had to the accompanying drawing, forming part of this specification.

This invention is more especially intended for pressing, shaping, and drying the bunches produced by the machine which is the subject of my Letters Patent No. 103,236, dated May 17, 1870, though it may be employed for shaping, pressing, and drying bunches produced by other means.

The invention comprises a mold or series of independent molds, made of porous material, and of an internal configuration which is the counterpart of the form of the cigar to be produced, while the exterior is of slightly-conical shape.

Each mold is divided longitudinally into two or more parts or sections, to provide for the introduction and removal of the bunch, and is permanently open at one of its ends, to facilitate the drying of the bunch by evaporation.

After the bunch, with or without a binder, has been inserted in said mold, the latter, being closed, is introduced, with its smallest end downward, through a hole in a table, rack, or stand, which serves to hold the divided mold closed, and to press and shape the bunch till sufficiently dried to receive the wrapper and retain its proper form without the aid of the mold.

Figure 1 in the accompanying drawing represents a view, in perspective, of a series of molds for pressing, shaping, and drying cigar-bunches in accordance with my invention, said molds being shown as in their places within or through a perforated table, that forms part of the apparatus. Figs. 2, 3, 4, and 5 represent a longitudinal outside view of a closed mold, a longitudinal section thereof, a face view of one half of the mold, and a transverse section, taken as indicated by the line *x x* in Fig. 1. Figs. 6, 7, and 8 represent an outside longitudinal view of a mold under a modified form of construction, closed, a view of the same open, and a transverse section through the line *z z* in Fig. 6.

Similar letters of reference indicate corresponding parts.

Referring in the first instance to Figs. 1, 2, 3, 4, and 5 of the drawing, A A represent molds, formed of any suitable porous material, or compound of materials, to facilitate the drying, by absorption, of the bunches contained within them. A compound of sawdust and any suitable adhesive substance will answer the purpose. These molds are of an interior configuration which is the counterpart of the form of the cigar to be produced, while externally they are of a slightly-conical shape, so that when inserted, with their smallest ends downward, through holes *b b* in a rack, stand, or table, B, they serve to press or bind on the bunches contained within them, or bunches surrounded by their binders. To facilitate the introduction and removal of the bunch, said molds are divided longitudinally into two or more parts, which divisions may have their proper relative positions secured to them by a dowel, *c*, in either division, made to fit a hole, *d*, of corresponding shape in the other division. The holes *b* in the table and tapering configuration of the molds on their exterior further serve to adjust the divided halves or portions of the molds. Said molds are left open at their one end, *e*, to expedite drying the bunches within them.

In Figs. 6, 7, and 8 the mold is represented as divided longitudinally into several parts, and united by an elastic band, *g*, at its closed end, whereby a very effective distribution of the closing pressure on the tobacco is produced, and on drawing the mold out of the hole *b* in the table it readily springs apart to release the bunch.

By thus employing porous molds, open at their one end and constructed as herein described, the bunch, with or without the binder on it, may be pressed, shaped, and dried at one and the same time, ready and in proper form for the wrapper or finishing process.

What is here claimed, and desired to be secured by Letters Patent, is—

The combination of the longitudinally-divided externally-taper porous mold and the perforated table, rack, or stand, substantially as and for the purpose herein set forth.

ADOLPH PEARL.

Witnesses:
FRED. HAYNES,
R. E. RABEAU,